United States Patent [19]

Hahn et al.

[11] Patent Number: 5,129,856
[45] Date of Patent: Jul. 14, 1992

[54] LEAF LARD STARTER

[75] Inventors: Nicholas R. Hahn; Timothy R. Cooke, both of Holland; Carl A. Wasson, Spring Lake, all of Mich.

[73] Assignee: Seffelaar & Looyen, Inc., Holland, Mich.

[21] Appl. No.: 640,033

[22] Filed: Jan. 11, 1991

[51] Int. Cl.⁵ .............................................. A22B 5/16
[52] U.S. Cl. .................................... 452/128; 452/132; 81/301
[58] Field of Search ............... 452/128, 125, 117, 132, 452/160, 167; 81/301

[56] References Cited

U.S. PATENT DOCUMENTS

| | | | |
|---|---|---|---|
| 3,111,870 | 11/1963 | Anderson | 81/301 |
| 3,269,223 | 8/1966 | Pawloski | 81/301 |
| 3,683,455 | 8/1972 | Anderson | 452/128 |
| 3,706,245 | 12/1972 | Van Schalk | 81/301 |
| 3,943,599 | 3/1976 | Norwood | 452/86 |
| 4,322,873 | 4/1982 | Lunn | 452/128 |
| 4,327,633 | 5/1982 | Leining et al. | 99/589 |
| 4,727,623 | 3/1988 | Durand | 452/125 |
| 4,776,063 | 10/1988 | Tieleman | 452/120 |
| 4,957,021 | 9/1990 | Helton | 81/301 |

FOREIGN PATENT DOCUMENTS 2613587 10/1988 France ......................... 452/128

Primary Examiner—Willis Little
Attorney, Agent, or Firm—Varnum, Riddering, Schmidt & Howlett

[57] ABSTRACT

A leaf lard starting apparatus for gripping a lower edge of leaf lard of a hog carcass or the like to initiate separation of the lower edge from the carcass preparatory to removal of the leaf lard from the carcass by other means. The leaf lard starting apparatus includes a leaf lard starter having a pair of clamps activated by a linear motor, and a handle for effecting the positioning of the starter. A control system includes a control valve actuated by means of a push button carried by the handle for controlling the operation of the leaf lard starting apparatus. The leaf lard starter is suspended from a trolley system by means of a second linear fluid motor, and when the push button has been depressed to activate the leaf lard starting apparatus and clamp the leaf lard, the control system automatically causes the second motor to elevate the starter to effectively begin the stripping of the leaf lard from the carcass. After the push button is released, the clamps are opened, followed by a timed delay and the lowering of the leaf lard starter to its original position.

11 Claims, 3 Drawing Sheets

LEAF LARD STARTER

BACKGROUND OF THE INVENTION

The present invention relates to a leaf lard starting apparatus which is employed to grasp a lower edge of leaf lard and pull the edge from the carcass to facilitate engagement by a leaf lard remover of the edge portion so released from the carcass.

More particularly, this invention relates to a leaf lard starter adapted to be suspended from an overhead trolley in a position adjacent to an animal carcass carried by a hanger of conventional type.

SUMMARY OF THE INVENTION

A leaf lard starting apparatus according to the invention comprises a leaf lard starter or clamp unit for engaging a starting edge of leaf lard of an animal carcass, a vertical suspension support for the clamp unit, including motor means for elevating it, and a manually initiated control system for first activating the clamp unit to grasp the leaf lard and then elevating the clamp unit to tear the grasped lard from the carcass.

The clamp unit or leaf lard starter comprises a pair of clamps at its forward end, which are operable to move from an open position to a closed position to grip a lower edge of leaf lard and initiate its removal from the hog carcass. The leaf lard starter is also provided with a handle, both for facilitating its positioning by the operator and for actuating it.

The leaf lard starter is suspended by means of a suspension system which includes the vertical support and the motor means, preferably a linear fluid motor. The motor means is adapted to elevate the leaf lard starter, once it has grasped the leaf lard, to tear the leaf lard partially away from the carcass. The leaf lard starter also includes a separate linear fluid motor for actuating the clamps thereof.

The control system includes a valve carried by the handle of the leaf lard starter which, when engaged, will cause the clamps to close on the leaf lard, and after a delay, will cause the linear fluid motor of the suspension system to be actuated to raise the leaf lard starter and tear a lower part of the leaf lard from the carcass. Then, when the control valve is released, the clamps will automatically open to release the leaf lard, and the linear fluid motor of the suspension system is again actuated for a preset period of time on this occasion to lower the leaf lard starter to its original or starting position.

With these and other features and advantages that will hereinafter appear, the nature of the invention will be more clearly understood by reference to the ensuing description, the appended claims, and the several views illustrated in the accompanying drawings.

THE DRAWINGS

THE ILLUSTRATED EMBODIMENT

Figure 1:
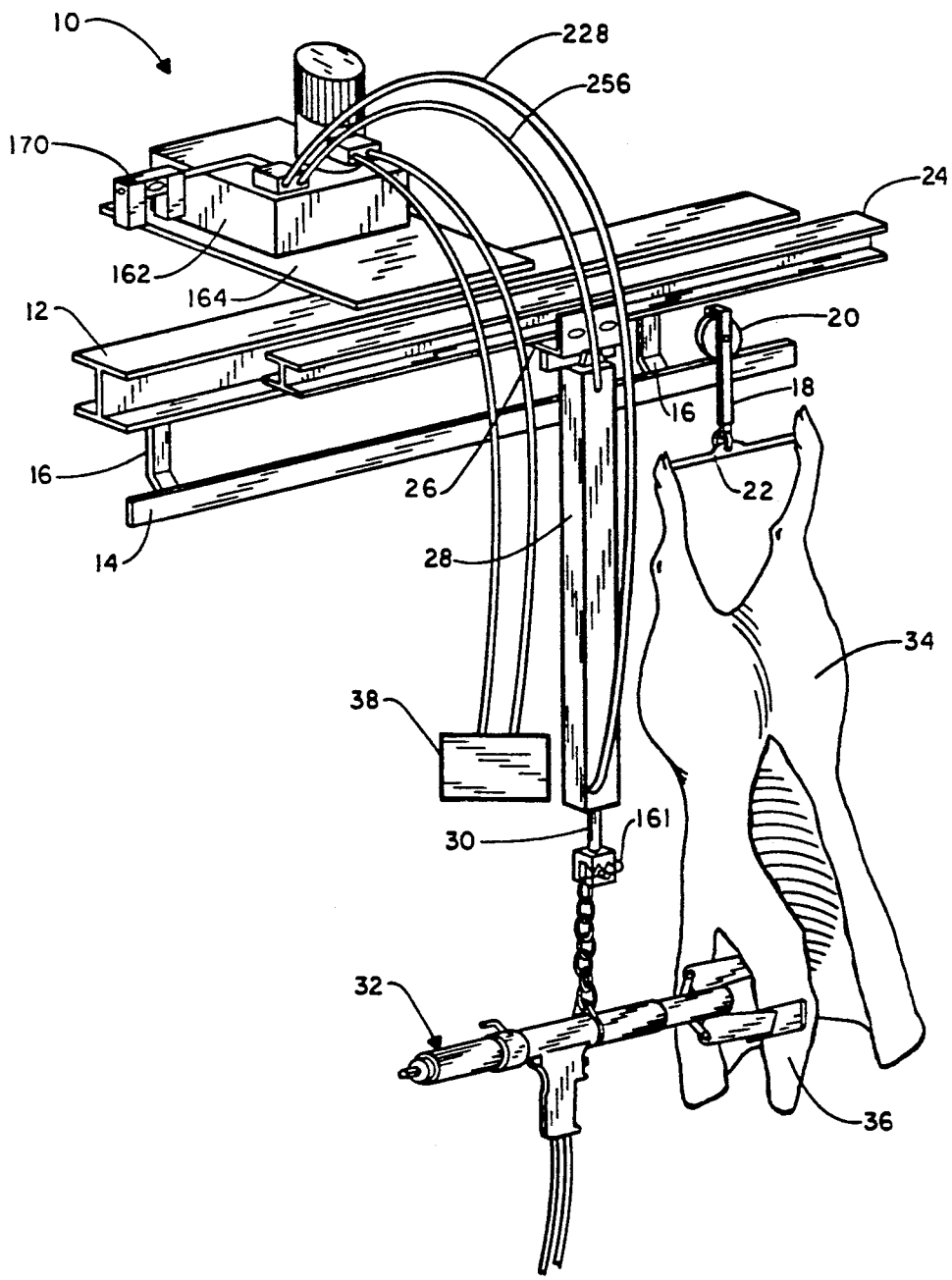
FIG. 1 is a perspective view showing a leaf lard starting apparatus according to the invention, and more particularly, the suspension of a leaf lard starter and the manner in which it is engaged with the leaf lard of a hog carcass.

Referring particularly to FIG. 1, there is illustrated a conventional suspension system for the carcasses of animals, such as hog carcasses. The conventional suspension system is generally identified by the numeral 10 and includes a main beam from which a rail 14 is suspended by way of suitable hangers 16. Also conventional is a support wheel 20 of a trolley 18 engaged with rail 14, the trolley carrying a hanger 22 for a hog carcass.

In accordance with this invention, however, at a preselected station along rail 14 there is provided a further rail 24 engaged by a second trolley 26 from which a linear fluid motor 28 is suspended. Fluid motor 28 includes a piston rod 30 from which is suspended a clamp unit or leaf lard starter 32. In FIG. 1, leaf lard starter 32 is shown initially engaged with a lower edge of leaf lard of a hog carcass generally identified by the numeral 34, the leaf lard being identified by the numeral 36.

A leaf lard remover, generally identified by the numeral 38, is also schematically illustrated in FIG. 1 and is employed to remove the leaf lard 36 after removal has been initiated by starter 32. While not specifically shown, leaf lard remover 38 will be suspended from a piston rod 30 in the same general manner as starter 32. The leaf lard remover 38 does not form any part of this invention and is not therefore shown in detail.

Figure 2:
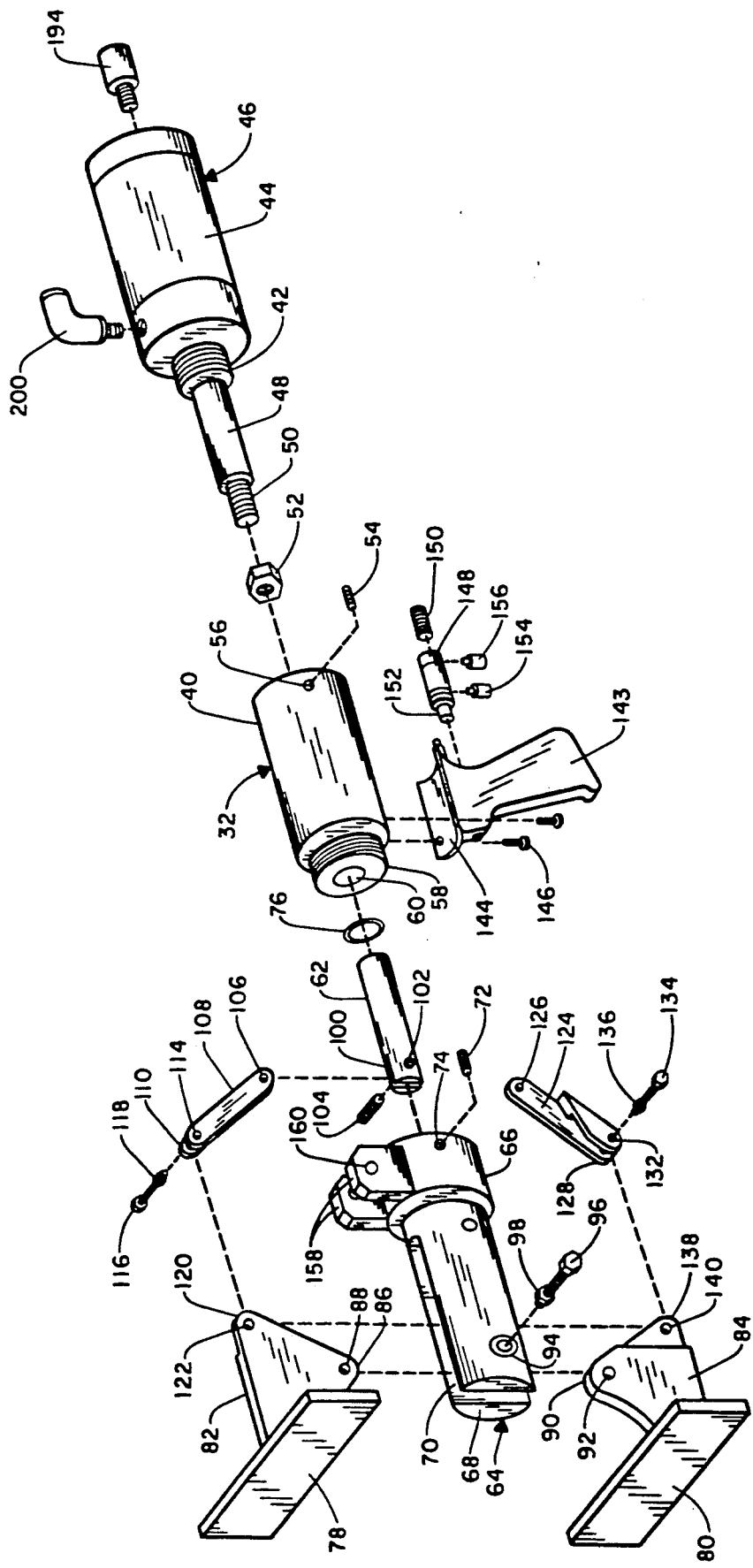
FIG. 2 is an exploded perspective view showing particulars of the leaf lard starter of FIG. 1.

Referring particularly to FIG. 2, leaf lard starter 32 includes a central tubular housing 40. The housing 40 is internally threaded at one end to receive an externally threaded boss 42 on the forward end of a cylinder 44 of a second linear fluid motor, generally identified by the numeral 46. Extending forwardly from boss 42 is a piston rod 48 having an externally threaded free end 50. A lock nut 52 is threadedly received on threaded end 50 for a purpose to be described hereinafter. The threaded connection between boss 42 and housing 40 is securely maintained by means of a set screw 54 threadedly received in an internally threaded radial bore 56 in the housing to engage boss 42, whereby to lock cylinder 44 against relative rotation in housing 40.

The forward end of housing 40 is also provided with an externally threaded boss 58 formed with a bore 60 through which passes an elongated tubular clevis 62. The rear or right-hand end of clevis 62 is internally threaded to receive threaded portion 50 of piston rod 48, the external diameter of clevis 62 preferably being equal to that of piston rod 48.

Clevis 62 is threaded to an adjusted position on piston rod 48, after which lock nut 52 is brought to bear against the right-hand end of clevis 62 to lock it into its adjusted position.

Leaf lard starter 32 also includes a clamp support generally identified by the numeral 64. Clamp support 64 is provided with a sleeve 66 at the right-hand end thereof and a bifurcated extension 68 at its left-hand end. Extension 68 defines an elongated vertical slot 70.

Sleeve 66 is internally threaded to be threadedly engaged on boss 58. Clamp support 64 is locked in an adjusted position relative to housing 40 by means of a set screw 72 which is threadedly received in a radial bore 74 in sleeve 66 to bear against boss 58 and thereby to lock clamp support 64 in an adjusted position relative to housing 40.

A suitable wiper ring 76 is mounted within boss 58 for wiping the exterior of clevis 62.

Clamp support 64 carries a pair of opposed clamps 78, 80 which are in the form of vertically disposed blades. Clamps 78, 80 are carried by ears 82, 84, respectively, which are also vertically disposed, but lie in planes at right angles to the planes of the clamps 78, 80.

Ear 82 has a lower corner 86 which is positioned within slot 70 and is formed with a bore 88 therethrough. Similarly, ear 84 has an upper corner 90 which is also positioned within the slot 70 and is formed with a bore 92 therethrough. Bores 88, 92 are aligned with a transverse bore 94 extending through the forward part of extension 68 and clamps 78, 80 are pivotally mounted with respect to clamp support 64 by a bolt or pivot pin 96 which passes through the aligned bores 94, 92 and 88. Bolt 96 is provided with a retaining nut 98.

The forward end of clevis 62 is bifurcated to define a vertical notch or slot 100. A bore 102 extends transversely of the slot 100 for receiving a pivot pin 104. The latter passes through a bore 106 in a lower rear end of a link 108 positioned within the slot 100 to pivotally mount the link.

Link 108 has a bifurcated forward end 110 which is formed with a transverse bore 114 to receive a pivot bolt 116 provided with a nut 118.

Ear 82 has an upper rear corner 120 of reduced thickness which is formed with a bore 122 therethrough. Corner 120 is received in the bifurcated end of link 108 with pivot bolt 116 passing through the aligned bores 114, 122.

Clevis 62 also carries a second link 124 of construction similar to that of link 108. Link 124 is provided with a transverse bore 126 extending through a rear end thereof. The rear end of link 124 is also positioned within slot 100 with pivot pin 104 also passing through bore 126. Link 124 will be positioned behind link 108 within the slot 100, as viewed in FIG. 2.

Link 124 has a bifurcated forward end 128 which is formed with a transverse bore 132 to receive a pivot bolt 134 provided with a nut 136.

Ear 84 has a lower rear corner 138 of reduced thickness, as shown, which is provided with a transverse bore 140. Corner 138 is received in bifurcated end 128 of link 124. Pivot bolt 134 also passes through bore 140 to pivotally mount ear 84.

Housing 40 is provided with a suitable handle 143 of the pistol-grip type. Handle 143 is formed with a curved upper surface 144 matching that of housing 40 and is secured to the housing by suitable bolts, such as the bolt 146 which passes through the curved upper portion 144 and is threaded into housing 40.

Handle 143 has incorporated in its upper portion a control valve 148 which incorporates an Allen screw 150 and is provided with a push button 152 for controlling the position of the control valve. The control valve 148 is also provided with a pair of fittings 154, 156 for fluid lines.

Sleeve 66 is provided with a pair of upstanding ears 158 having transverse bores 60 therethrough which receive a pivot pin 161 (FIG. 1) securing leaf lard starter 32 to the lower end of piston rod 30 or an extension thereof.

Referring once again to FIG. 1, a control box 162 is mounted on a plate 164 carried by beam 112 and extending to one side of the beam. Control box 162 carries semiautomatic controls for the operation of fluid motors 28 and 44.

Figure 3:
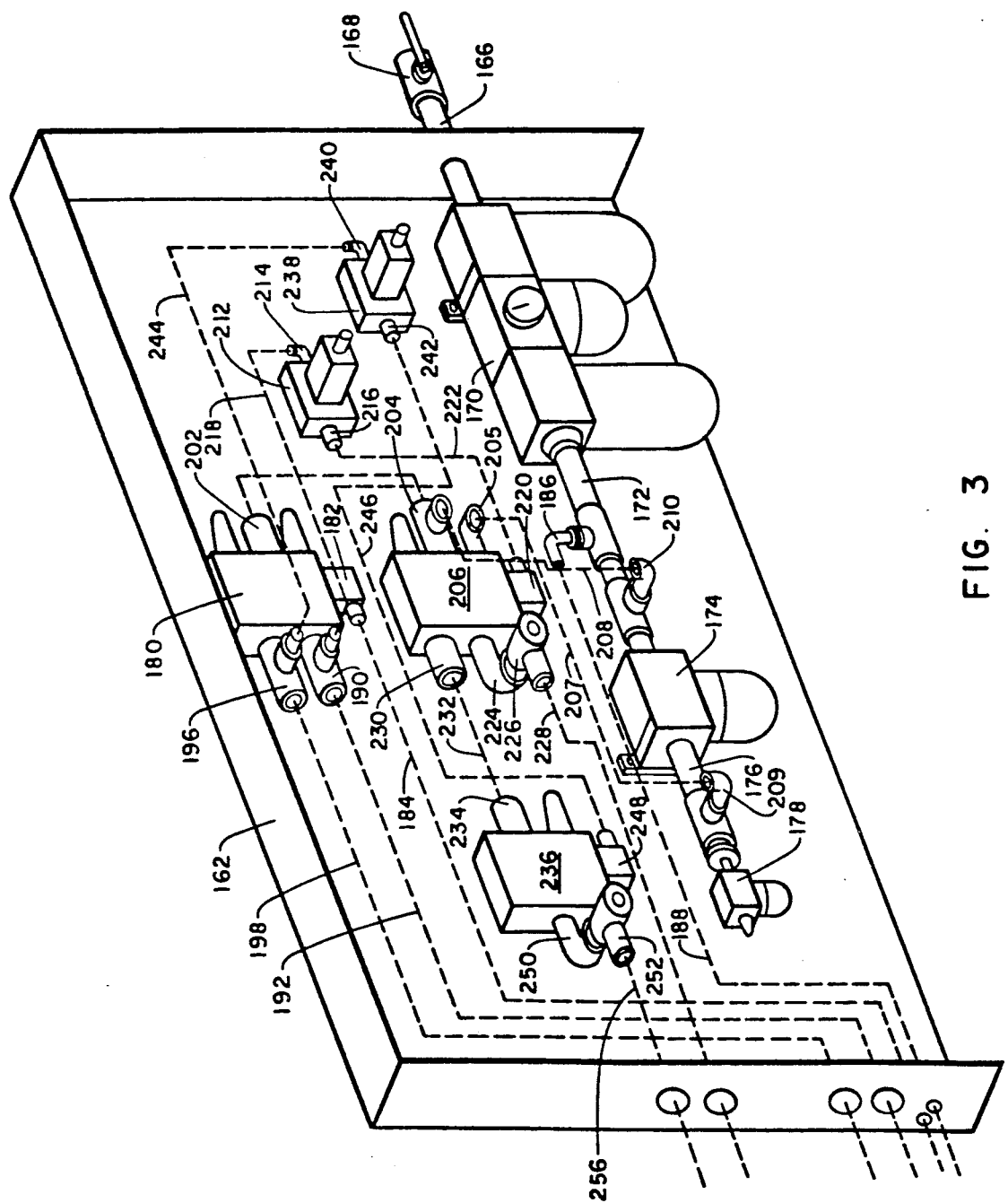
FIG. 3 is a perspective view showing particulars of the control unit for actuating the clamps of the leaf lard starter of FIGS. 1 and 2 and the linear fluid motor of the suspension system for raising and lowering the leaf lard starter.

Particulars of the controls are best shown in FIG. 3. A main air supply line 166 having a shutoff valve 168 is coupled to a suitable unit 170 which may include filters for removing moisture and foreign matter from the air supplied and a pressure controller, and may also add to the air a limited supply of lubricant.

A line 172 extends from unit 170 to a pressure controller 174. A further line 176 extends from the pressure controller 174 to a pressure relief valve 178.

The control system includes a clamp control valve 180 which is spring loaded and provided with a position controller 182 connected by a line 184 to the control valve 148 of starter 32 (FIG. 2). Line 172 is provided with a fitting 186 to which is connected a fluid supply line 188 leading to control valve 148.

Control valve 180 is provided with a fitting 190 to which is coupled a line 192 which, in turn, is coupled to a fitting 194 at the rear of linear fluid motor 46 for effecting movement thereof to a clamping position. Control valve 180 also includes a fitting 196 to which is connected a line 198 leading to a fitting 200 carried by a forward portion of linear fluid motor 46 to actuate the same to an unclamping position.

When valve 148 is not energized, there will be no air flow to position controller 182 and directional control valve 180 will be spring-urged to a position in which air will flow under pressure to fitting 196 to maintain motor 46 in a retracted position. On the other hand, when the starter control valve 148 is energized by manually depressing push button 152, position controller 182 will provide air flow to fitting 190 and air line 192. Air to operate motor 46 is supplied to valve 180 via a fitting 202 which receives air from a fitting 204 of a directional valve 206 similar to valve 180. Fitting 204, in turn, has connected to it a fluid supply line 208 by way of a fitting 210 incorporated in line 172. Time delay valve 212 has an inlet fitting 214 connected to fitting 190 by an air line 218 and an outlet fitting 216 coupled to a position controller 220 of directional valve 206 by way of an air line 222. Thus, the position of directional control valve 206 is changed only when directional control valve 180 is energized to activate clamps 78, 80.

Directional control valve 206 is provided with an outlet fitting 224 which incorporates an adjustable flow control device 226. The latter, in turn, is connected by means of a line 228 to the lower end of extensible fluid motor 28 (FIG. 1) which, when activated, will act to elevate the leaf lard starter 32.

Directional valve 206 is also provided with an outlet fitting 230 which is coupled to fluid line 232 which is in turn coupled to inlet fitting 234 on a third directional control valve 236. Inlet fitting 205 is coupled to fluid line 207 which in turn is coupled to fitting 209 on line 176 which is connected to pressure controller 174. Pressure controller 174 is used to provide air at a substantially reduced pressure.

Directional valve 206 is normally positioned to simultaneously direct high pressure air from fitting 204 to fitting 230 and reduced pressure air from fitting 205 to fitting 224. Thus, reduced pressure air is normally directed to the lower end of extensible fluid motor 28. This reduced pressure air counteracts the weight of the leaf lard starter 32 such that the linear fluid motor 28 will remain in a selected position, other than fully extended.

A second time delay valve 238 is provided with an inlet fitting 240 and an outlet fitting 242. A fluid line 244 connects inlet fitting 240 to fitting 196 of directional control valve 180 so that air is normally directed through fitting 240 when leaf lard starter 32 is in its inactive position. Outlet fitting 242 is connected by a fluid line 246 to a position controller 248 of directional control valve 236.

Directional control valve 236 is provided with an outlet fitting 250 equipped with an adjustable flow control device 252, which is connected to a flow line 256. The opposite end of flow line 256 is connected to the upper end of linear fluid motor 28. When position controller 248 is energized, air from directional control valve 206 is supplied to fitting 250 to urge the piston rod 30 to a lowermost or down position.

OPERATION

Before each instance in which leaf lard starter 32 is employed, it will normally be in a lower position with clamps 78, 80 in their open or separated attitudes. When the operator appropriately positions the clamps relative to the lower edge of the leaf lard 36 and depresses button 152 of control valve 148, the position control valve 180 will be energized to supply air under pressure through line 192 to linear fluid motor 46 to close clamps 78, 80 on the leaf lard 36. With button 152 still depressed, there will be air flow to time delay valve 238 which, after a preselected period of time has elapsed, will cause a shift in position of directional control valve 206 and deliver air at a controlled rate to air line 228. This causes linear fluid motor 28 to elevate leaf lard starter 32, whereby it begins to strip the leaf lard from the hog carcass. When the operator judges that stripping of the leaf lard 36 has been sufficiently started, he will release push button 152 with the result that directional control valves 180 and 206 will be returned to their initial positions. Operation of linear fluid motor 46 is thereby effected to separate clamps 78, 80 and release the leaf lard 36. Then, for a time period defined by time delay valve 238, directional control valve 236 will be activated to direct air through line 256 to linear fluid motor 28 to cause it once again to move leaf lard starter 32 downwardly to its original position.

Thereafter, leaf lard remover 38 may be employed to completely remove the leaf lard 36 from the hog carcass.

While the invention has been described in connection with a specific embodiment thereof, it will be understood that this is by way of illustration and not of limitation, and that the scope of the appended claims should be construed as broadly as the prior art will permit.

What is claimed is:

1. A leaf lard starting comprising a clamp unit for engaging a staring edge of leaf lard of an animal carcass, a vertical suspension support for the clamp unit, the vertical suspension support including motor means for elevating the clamp unit, and a manually initiated control system for first activating the clamp unit and then automatically elevating the clamp unit to tear clamped leaf lard from a carcass, the clamp unit including a pair of opposed clamps, and a first linear fluid motor for the clamps, the motor means comprising a second linear fluid motor, the control system including a first directional valve for the first linear fluid motor, a control valve for moving the first directional valve to a position for advancing the first linear fluid motor, a second directional valve operative in response to movement of the first directional valve to the first linear fluid motor advance position to advance the second linear fluid motor, and a third directional valve operative in response to movement of the first directional valve to the first linear fluid motor retreat position.

2. A leaf lard starting apparatus according to claim 1, wherein the control system includes a first timer between the first directional valve and the second directional valve, and a second timer between the first directional valve and the third directional vale.

3. A leaf lard starting apparatus according to claim 2, wherein the control system includes adjustable flow control means for controlling the speed of operation of the second linear fluid motor.

4. A leaf lard starting apparatus comprising a clamp unit for engaging a starting edge of leaf lard of an animal carcass, a vertical suspension support for the clamp unit, the vertical suspension support including motor means for elevating the clamp unit, and a manually initiated control system for first activating the clamp unit and then automatically elevating the clamp unit to tear clamped leaf lard from a carcass, the control system including means for the timed de-energization of the clamp unit followed by actuation of the motor means to return the clamp to a starting elevation.

5. A leaf lard starting apparatus comprising a clamp unit for engaging a starting edge of leaf lard of an animal carcass, a vertical suspension support for the clamp unit, the vertical suspension support including a trolley, and motor means for elevating the clamp unit, the motor means being carried by the trolley to facilitate positioning of the clamp unit relative to a carcass from which leaf lard is to be stripped, and a manually initiated control system for first activating the clamp unit and then automatically elevating the clamp unit to tear clamped leaf lard from a carcass.

6. A leaf lard starting apparatus comprising a clamp unit including a housing, a hand grip carried by the housing, a linear fluid motor secured to one end of the housing and having a piston rod extending through the housing, a clamp support extending from an opposite end of the housing, clamps pivotally carried by the clamp support, a clevis within the clamp support and carried by the piston rod for movement with the piston rod, links extending between the clevis and the clamps for moving the clamps between open and closed positions in response to movement of the clevis, and a control valve carried by the handle controlling the actuation and position of the linear fluid motor.

7. A leaf lard starting apparatus according to claim 6, wherein the clamp support is in the form of a sleeve engageable with the housing and having a bifurcated extension defining a slot, the clamps having mounting ears extending into the slot and pivotally connected to the bifurcated extension.

8. A leaf lard starting apparatus according to claim 6, wherein each of the links have spaced free ends defining a bifurcated portion for receiving a portion of a respective one of the clamps.

9. A leaf lard starting apparatus according to claim 6, including a control valve for controlling actuation of the linear fluid motor, the control valve being carried by the handle.

10. A leaf lard starting apparatus according to claim 7, wherein the sleeve carries a fitment for engaging a support for the leaf lard starting apparatus.

11. A leaf lard starting apparatus according to claim 6, wherein the housing has a screw-threaded connection with both the linear fluid motor and the clamp support.

* * * * *

UNITED STATES PATENT AND TRADEMARK OFFICE
CERTIFICATE OF CORRECTION

PATENT NO. : 5,129,856

DATED : July 14, 1992

INVENTOR(S) : NICHOLAS R. HAHN, TIMOTHY R. COOKE, and CARL A. WASSON

It is certified that error appears in the above-identified patent and that said Letters Patent is hereby corrected as shown below:

Claim 1, Column 5, line 53, before "comprising" insert --apparatus--.

Signed and Sealed this

Thirty-first Day of August, 1993

Attest:

BRUCE LEHMAN

*Attesting Officer*  *Commissioner of Patents and Trademarks*